(12) United States Patent
Sugai et al.

(10) Patent No.: US 8,273,428 B2
(45) Date of Patent: Sep. 25, 2012

(54) BIODEGRADABLE MOLDED ARTICLE AND CONTAINER USING THE MOLDED ARTICLE

(75) Inventors: Masahiro Sugai, Isehara (JP); Junichi Chiba, Isehara (JP); Masato Suzuki, Isehara (JP); Shuichi Kitora, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 89 days.

(21) Appl. No.: 12/919,083

(22) PCT Filed: Feb. 26, 2009

(86) PCT No.: PCT/JP2009/053574
§ 371 (c)(1),
(2), (4) Date: Sep. 20, 2010

(87) PCT Pub. No.: WO2009/107730
PCT Pub. Date: Sep. 3, 2009

(65) Prior Publication Data
US 2011/0008562 A1  Jan. 13, 2011

(30) Foreign Application Priority Data
Feb. 29, 2008 (JP) ................. 2008-051273

(51) Int. Cl.
*B65D 1/02* (2006.01)
*B29B 7/00* (2006.01)
(52) U.S. Cl. ................. 428/35.7; 428/36.92; 428/542.8
(58) Field of Classification Search ............ 428/34.1, 428/34.4, 34.6, 34.7, 35.7, 36.4, 36.9, 36.91, 428/36.92, 542.8
See application file for complete search history.

(56) References Cited

U.S. PATENT DOCUMENTS

| | | | |
|---|---|---|---|
| 5,409,751 A | 4/1995 | Suzuki et al. | |
| 2004/0210031 A1* | 10/2004 | Itoh et al. | 528/272 |
| 2008/0230954 A1* | 9/2008 | Gruber et al. | 264/319 |

FOREIGN PATENT DOCUMENTS

| | | |
|---|---|---|
| JP | A-06-023828 | 2/1994 |
| JP | A-2001-354223 | 12/2001 |
| JP | A-2004-091684 | 3/2004 |
| JP | A-2008-007736 | 1/2008 |
| JP | A-2008-030306 | 2/2008 |
| JP | A-2008-081619 | 4/2008 |
| WO | WO 2007/138842 A1 | 12/2007 |

OTHER PUBLICATIONS

International Search Report issued in Application No. PCT/JP2009/053574; Dated May 19, 2009 (With Translation).
Extended European Search Report issued in Application No. 09714672.4 dated Aug. 3, 2011.
Dec. 20, 2011 Office Action issued in Canadian Application No. 2,717,131.
May 15, 2012 Office Action issued in Japanese Patent Application No. 2008-051273 (with translation).

* cited by examiner

*Primary Examiner* — Walter B Aughenbaugh
(74) *Attorney, Agent, or Firm* — Oliff & Berridge, PLC

(57) ABSTRACT

A biodegradable molded article and a container using the molded article, exhibiting heat resistant properties. The molded article is obtained by injection molding a polylactic acid resin, wherein the polylactic acid resin of the molded article contains less than 4 mol % of D-lactic acid. The molded article has a crystallized portion having a ratio of the crystallizing heat quantity to the melting heat quantity ($|\Delta Hc|/|Hm|$), which ratio is not more than 0.7 in a differential scanning calorimetry (DSC) curve.

9 Claims, 1 Drawing Sheet

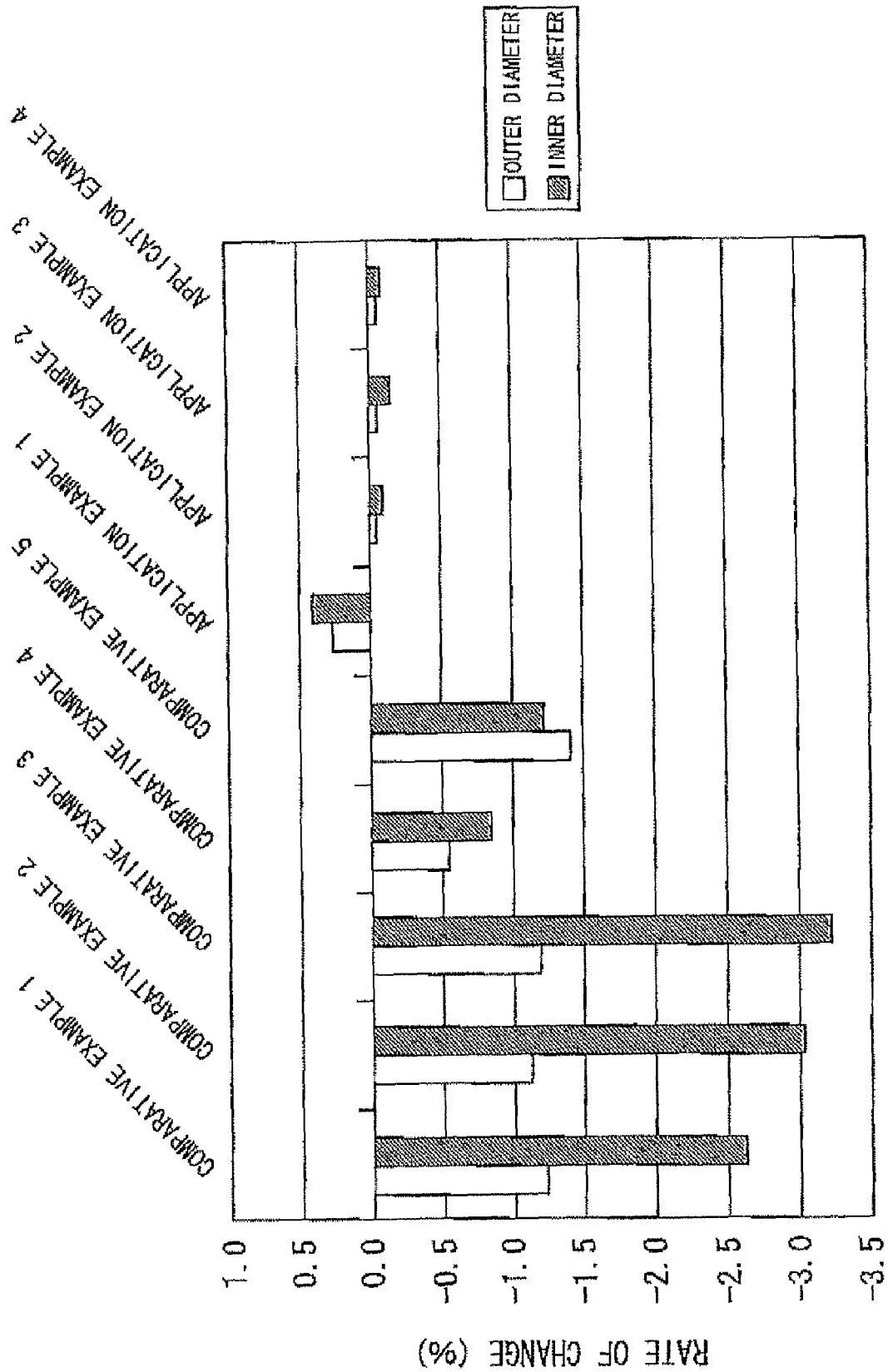

BIODEGRADABLE MOLDED ARTICLE AND CONTAINER USING THE MOLDED ARTICLE

TECHNICAL FIELD

The present invention relates to a biodegradable molded article which can be disintegrated and vanished by bacteria or the like, existing in natural environment, as well as a container produced by using the molded article. In particular, the present invention intends to realize a practically acceptable heat resistance at a non-stretched portion of the biodegradable molded article, or of the container produced by using such a molded article.

BACKGROUND ART

Generally, plastic containers are classified and subjected to disposal as noncombustible waste. In order to save labors upon waste disposal, biodegradable containers are recently under development, since such biodegradable container can be disintegrated and vanished by itself, with the aid of bacteria or the like. As such resin, polylactic acid resin (lactic acid fermentation product from starch) is readily obtainable.

With respect to polylactic acid (PLA) resin, it is known that the glass transition temperature (Tg) is as low as about 58° C. and the crystallizing speed is relatively low, so that a sufficient heat resistance of the container may not be achieved as compared to a container made of polyethylene terephthalate resin or the like. With respect to the waist portion of the container, heat resistance can be more or less improved by performing presetting during stretching (blow molding). However, practical use of a heat resistant container made of polylactic acid resin has been considered to be still problematic, due to the difficulty in terms of crystallization of non-stretched portion of the container, such as a mouth portion.

As the related art addressed to such problems, there has been proposed a container with a stereocomplex structure obtained by using a resin composition containing poly-L-lactic acid and poly-D-lactic acid in a mol ratio of 60-95:40-5 and performing stretching. Refer, for example, to Patent Document 1.

Patent Document 1: JP 2008-007736A

The conventional container described above makes it possible to increase the crystallizing speed of the non-stretched portion, with the result that the heat resistance can be improved even when poly-lactic acid resin is used. Still, however, there remains difficulty as to efficient production, in view of potential degradation of the moldability (stretching property) of such resin.

DISCLOSURE OF THE INVENTION

Task to be Solved by the Invention

It is an object of the present invention to provide a biodegradable molded article with improved heat resistance without sacrificing the moldability, as well as a container using such a molded article.

Means for Solving the Task

One aspect of the present invention resides in a molded article adopted to be subjected to subsequent stretching, obtained by injection molding polylactic acid resin, wherein the molded article comprises poly-L-lactic acid containing less than 4 mol % of D-lactic acid, and having, at least locally, a crystallized portion having a ratio of the crystallizing heat quantity to the melting heat quantity ($|\Delta Hc|/\Delta Hm$), which ratio is not more than 0.7 in a temperature rising chart obtained by differential scanning calorimetry (DSC).

With respect to the molded article having a structure as described above, the injection molding can be performed under the injection speed of 6-12 mm/sec, injection pressure of 50 MPa, and resin temperature of 213-220° C.

Another aspect of the present invention resides in a biodegradable container having a final shape obtained by stretching of a molded body that comprises polylactic acid resin, wherein the polylactic acid resin comprises poly-L-lactic acid containing less than 4 mol % of D-lactic acid, and having a crystallized portion having a ratio of the crystallizing heat quantity to the melting heat quantity ($|\Delta Hc|/\Delta Hm$), which ratio is not more than 0.7 in a temperature rising chart obtained by differential scanning calorimetry (DSC), the crystallized portion forming a non-stretched portion of the container.

Here, in connection with the ratio of the crystallizing heat quantity to the melting heat quantity ($|\Delta Hc|/\Delta Hm$), the crystallizing heat quantity $|\Delta Hc|$ refers to the heat quantity where the crystallizing peak is expressed in the temperature rising chart by differential scanning calorimetry (DSC), and the melting heat quantity refers to the heat quantity where the melting peak is expressed (at about 170° C.). If this ratio is not more than 0.7, crystallization at the non-stretched portion can be produced at a relatively high speed even when polylactic acid resin is used, comparable to a case where polyethylene terephthalate resin is used.

In a typical stretching, the region of the container, which forms the non-stretched portion, is a mouth portion or bottom portion of the container. The stretching can be suitably performed during the course of a biaxial stretch blow molding.

Effects of the Invention

In accordance with the present invention, a preform or the like article is injection molded by using a resin that comprises poly-L-lactic acid containing less than 4 mol % of D-lactic acid, and is then subjected to stretching, allowing crystallization (whitening) of the non-stretched portion to occur without degrading the stretching property. In this instance, the ratio of crystallizing heat quantity to the melting heat quantity ($|\Delta Hc|/\Delta Hm$) in the crystallized portion is not more than 0.7, thereby allowing improvement in the heat resistance even when poly-lactic acid is used. Here, the term "crystallization" in particular refers to the crystallization of a region corresponding to the mouth portion of a container, and includes not only crystallization following stretching and subsequent heat treatment with respect to the remaining non-stretched portion, but also stretching following previous heat treatment in a state of preform which had been obtained by injection molding.

BRIEF DESCRIPTION OF THE DRAWING

FIG. 1 is a chart showing the results of investigations performed with respect to the changing rate of the inner and outer diameters at the mouth portion of a container.

BEST MODE FOR CARRYING OUT THE INVENTION

In accordance with the present invention, as described above, there is used a polylactic acid resin that comprises poly-L-lactic acid containing less than 4 mol % of D-lactic acid. If the content of D-lactic acid exceeds 4 mol %, the crystallizing speed is retarded so that crystallization as a result of heat treatment becomes difficult. The content of D-lactic acid is less than 4 mol %, or zero if possible, serves to effectively increase the crystallizing speed, thereby allowing crystallization of the non-stretched portion as a result of heat treatment.

In order to mold such a resin by injection molding so as to prepare an article (e.g. preform), the injection molding is performed under the conditions of injection speed of 6-12 mm/sec, injection pressure of 50 MPa, and resin temperature of 213-220° C. By satisfying these conditions, the crystallized non-stretched portion exhibits a ratio of crystallizing heat quantity to the melting heat quantity ($|\Delta Hc|/\Delta Hm$), which ratio can be made as low as not more than 0.7, without degrading the stretching property during the subsequent stretching.

crystallization (whitening), followed by biaxial stretch blow molding under the conditions identified below, in order to produce bottles with a volume capacity of 400 ml. For such bottles, investigations were made as to acceptability of heat resistance at the mouth portion. More particularly, the bottles were immersed in hot water at a temperature of 95° C. for 5 minutes, to determine shrinkage (%) of the outer and inner diameters of the mouth portion. The shrinkage in a range of ±0.5% was deemed to be acceptable and shown by symbol "○".

Biaxial Stretch Blow Molding

Blow molding conditions are as follows:

Preform heating temperature 95° C.

Mold temperature 75° C.

Stretch ratio 8.1 times

TABLE 1

| | | Comparative Example 1 | Comparative Example 2 | Comparative Example 3 | Comparative Example 4 | Comparative Example 5 | Application Example 1 | Application Example 2 | Application Example 3 | Application Example 4 |
|---|---|---|---|---|---|---|---|---|---|---|
| Injection Conditions | Speed (mm/sec) | 6 | 3 | 12 | 6 | 3 | 6 | 6 | 6 | 12 |
| | Pressure (MPa) | 50 | 75 | 50 | 50 | 75 | 50 | 50 | 50 | 50 |
| | Time (sec) | 14 | 18.5 | 16 | 14 | 18.5 | 14 | 14 | 14 | 16 |
| | Resin temp. (° C.) | 213 | 220 | 220 | 213 | 220 | 213 | 213 | 213 | 220 |
| Crystallization heating time (min) | | N/A | N/A | N/A | 2 | 5 | 2.5 | 5 | 10 | 5 |
| Melting heat quantity $\Delta Hm$ (mJ/mg) | | 32.7 | 33.7 | 36.4 | 32.5 | 33.3 | 34.6 | 44.7 | 44.3 | 41.7 |
| Crystallizing heat quantity $\Delta Hc$ (mJ/mg) | | −32.4 | −28.3 | −39.1 | −24.4 | −26.3 | −22.0 | 0 | 0 | −4.76 |
| $|\Delta Hc|/\Delta Hm$ | | 0.99 | 0.84 | 1.08 | 0.75 | 0.79 | 0.64 | 0 | 0 | 0.11 |
| Mouth inner/outer diameter change rate (%) | | −2.63 | −3.04 | −3.23 | −0.85 | −1.23 | 0.40 | −0.09 | −0.15 | −0.08 |
| Heat resistance | | x | x | x | x | x | ○ | ○ | ○ | ○ |

The crystallization of the non-stretched portion is performed, taking into account the thermal properties of the polylactic acid (e.g. glass transition temperature Tg, crystallizing temperature Tc, etc.), at a resin surface temperature of 100-120° C. and for the duration of 5-10 minutes. The heating may be performed by using an infrared lamp, ordinary radiation heater, hot wind blower or high frequency heater.

The stretching is performed in the course of blow molding, wherein the article (e.g. preform) obtained by injection molding is heated to a temperature of 70-90° C., and the mold temperature is maintained at 70-90° C.

The biodegradable container in accordance with the present invention, in particular its mouth portion, can not only be sterilized by applying hot water shower, but also fully withstands the hot filling wherein the contents is filled typically under a temperature of about 90° C.

There was used a poly-L-lactic acid resin containing 1.6% of D-lactic acid (7032D resin produced by NatureWorks LLC), which was molded by an injection machine to prepare preforms having a test tube shape, with a mouth outer diameter of 32 mm and length of 80 mm, under the conditions shown in Table 1. The so-obtained preforms were subjected to heating with respect to the mouth portion at a temperature of 110° C. and under the conditions of Table 1 for achieving The results of such investigation are shown in FIG. 1. Although the temperature rising chart is not shown, there was used a differential scanning calorimeter (DSC6220 calorimeter produced by SII NanoTechnology Inc.), in order to determine the crystallizing heat quantity and the melting heat quantity in a temperature range of 30-210° C., by measuring the test pieces at a temperature rising speed of 10° C./min, which had been cut out of the bottle mouth portion, both before and after the crystallization.

It can be appreciated from FIG. 1 that the containers produced in accordance with the present invention (Application Examples 1-4) have their mouth portions crystallized, exhibiting an extremely low change rate of the inner and outer diameters of the mouth portion, and thereby providing significantly improved heat resistance.

INDUSTRIAL APPLICABILITY

The present invention allows production of biodegradable article and biodegradable container having improved heat resistance due to crystallization of the non-stretched portion.

The invention claimed is:

1. A molded article adopted to be subjected to subsequent stretching, obtained by injection molding polylactic acid resin, wherein the polylactic acid resin of the molded article contains less than 4 mol % of D-lactic acid, and has a crystallized portion having a ratio of the crystallizing heat quantity to the melting heat quantity ($|\Delta Hc|/\Delta Hm$), which ratio is not more than 0.7 in a differential scanning calorimetry (DSC) curve.

2. The molded article adopted to be subjected to subsequent stretching, obtained by injection molding polylactic acid resin, according to claim 1, wherein the injection molding is carried out at an injection speed of 6-12 mm/sec.

3. The molded article adopted to be subjected to subsequent stretching, obtained by injection molding polylactic acid resin, according to claim 1, wherein the injection molding is carried out at an injection pressure of 50 MPa.

4. The molded article adopted to be subjected to subsequent stretching, obtained by injection molding polylactic acid resin, according to claim 1, wherein the injection molding is carried out at a resin temperature of 213-220° C.

5. The molded article adopted to be subjected to subsequent stretching, obtained by injection molding polylactic acid resin, according to claim 1, wherein the injection molding is carried out at an injection speed of 6-12 mm/sec, an injection pressure of 50 MPa, and a resin temperature of 213-220° C.

6. A biodegradable container, which can be disintegrated and vanished in a natural environment, having a final shape obtained by stretching of a molded body that comprises polylactic acid resin, wherein:

the polylactic acid resin comprises poly-L-lactic acid containing less than 4 mol % of D-lactic acid, and having a crystallized portion having a ratio of the crystallizing heat quantity to the melting heat quantity ($|\Delta Hc|/\Delta Hm$), which ratio is not more than 0.7 in a differential scanning calorimetry (DSC) curve, the crystallized portion forming a non-stretched portion of the container.

7. The biodegradable container according to claim 6, wherein the non-stretched portion is a mouth portion of the container.

8. The biodegradable container according to claim 6, wherein the stretching is carried out as biaxial stretch blow molding.

9. The biodegradable container according to claim 7, wherein the stretching is carried out as biaxial stretch blow molding.

\* \* \* \* \*